Patented July 3, 1928.

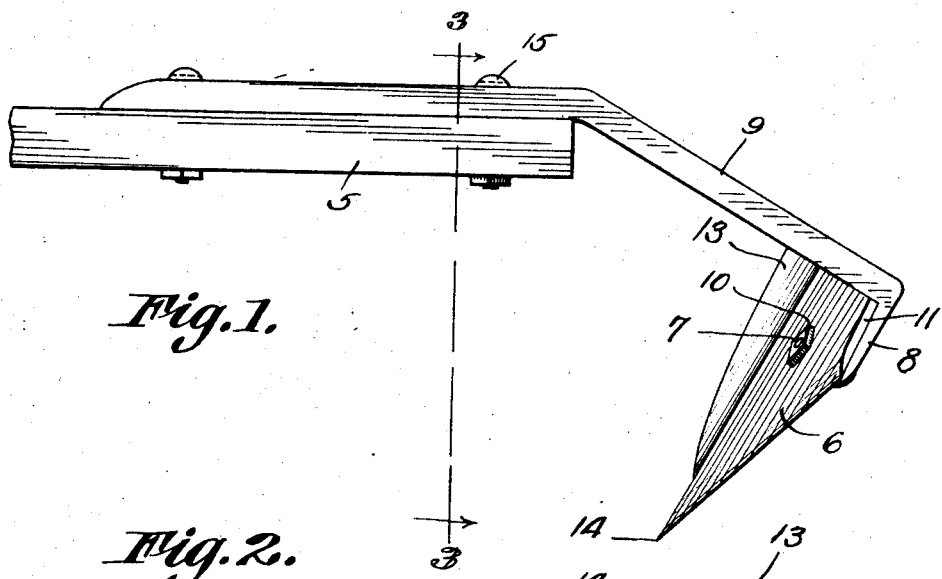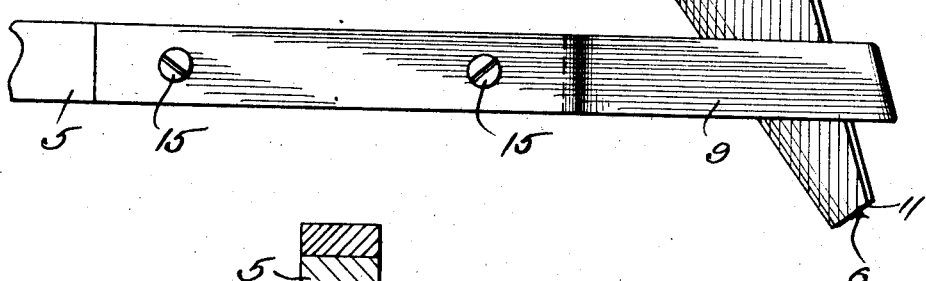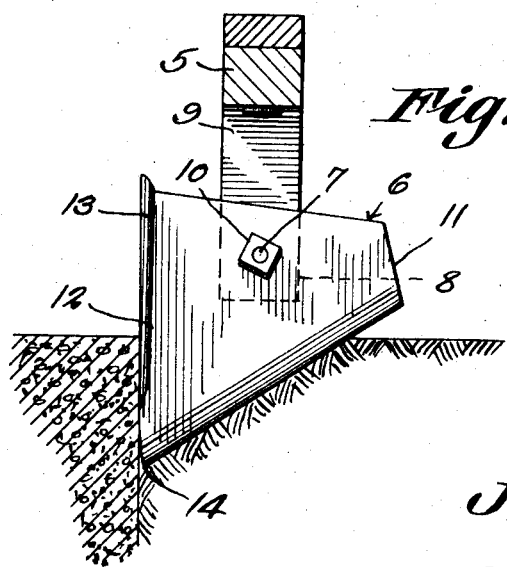

1,675,670

UNITED STATES PATENT OFFICE.

JOHN G. SPAHN, OF LYONS, IOWA.

LAWN EDGER.

Application filed November 8, 1926. Serial No. 147,014.

This invention has reference to agricultural implements and more particularly an implement especially designed for cutting the earth and grass at the edge of a sidewalk or curb, at the same time forming or reshaping the gutter usually formed along the edge of the sidewalk.

Another object of the invention is to provide a tool of this character that may be employed in removing weeds such as dandelions or the like, from a lawn.

A still further object of the invention is to provide a tool having a shearing action when the tool is used as a hoe in the hands of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of an agricultural implement constructed in accordance with the invention.

Figure 2 is a plan view thereof.

Figure 3 is a sectional view taken on line 3—3 of Figure 1.

Referring to the drawing in detail, the reference character 5 designates the handle of the implement which may be of any desired length.

The blade is indicated generally by the reference character 6 and is provided with an opening to accommodate the bolt 7 that secures the blade to the right angled end portion 8 of the shank 9 forming a part of the implement.

A nut 10 is provided on the bolt and acts to prevent the blade from becoming disconnected. As shown by the drawing, the shank 9 extends downwardly to the end that when the blade is in operation, the blade will be supported at an oblique angle with respect to the ground surface over which the same is being moved, to insure the same cutting into the ground surface with the least amount of exertion on the part of the operator.

The right angled end portion 8 is also disposed at an oblique angle with respect to the side edges of the shank 9 so that the blade will be supported at an oblique angle to insure a shearing action at the cutting edge thereof, when the implement is being used as a hoe or implement for cutting along the edge of a walk.

As illustrated by Figure 3, the lower or cutting edge of the blade 6 is disposed at an oblique angle defining a narrow edge 11 and a substantially wide edge 12, the wide edge being provided with a right angled flange 13 that has its lower end merging into the blade at a point in spaced relation with the end 14 of the wide edge of the blade defining a pointed portion so that the implement may be forced into the ground surface. It will further be seen that due to this construction, the operator may gauge the cut.

It will further be seen that due to this construction, the lower edge of the blade will be caused to cut into the surface to accomplish the purpose of the invention in forming what might be termed a V-shaped gutter at the edge of a sidewalk.

Bolts 15 pass through the shank and secure the shank to the handle 5 as shown by Figure 1.

I claim:

A lawn edger including a handle, a shank secured to the handle and having a right angled end portion arranged at an oblique angle with respect to the shank, a blade secured to the end portion, said blade having an obliquely disposed cutting edge and having a rearwardly extended flange, the lower end of the flange merging into the blade and tapered to provide a cutting edge.

In testimony that I claim the foregoing as my own, I have hereto affixed my signature.

JOHN G. SPAHN.